3,081,878
REVERSE WASH STRAINER
Donald L. McCarty, 1610 First National Bank Bldg., Dallas, Tex.
Filed Aug. 13, 1959, Ser. No. 833,580
1 Claim. (Cl. 210—411)

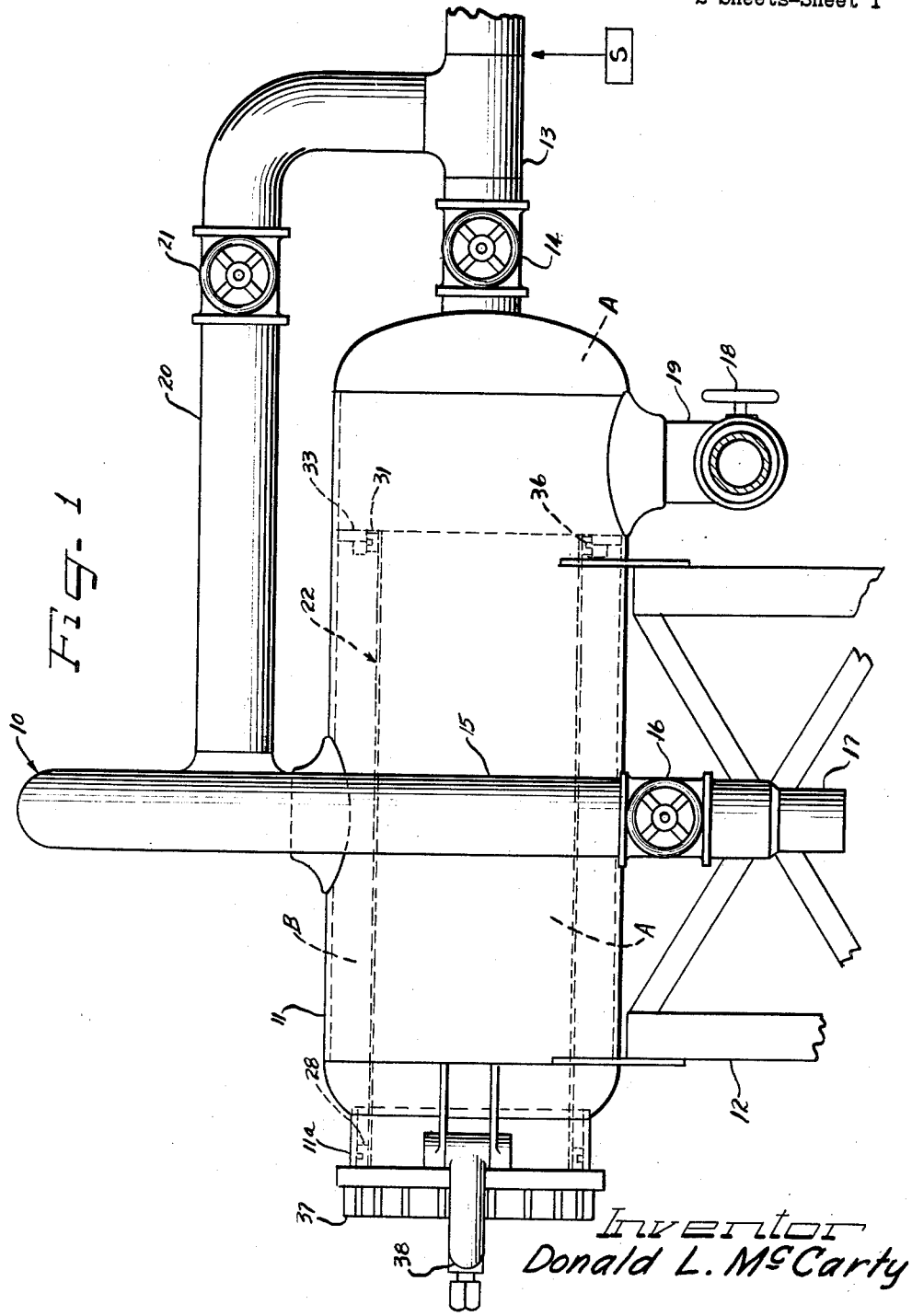

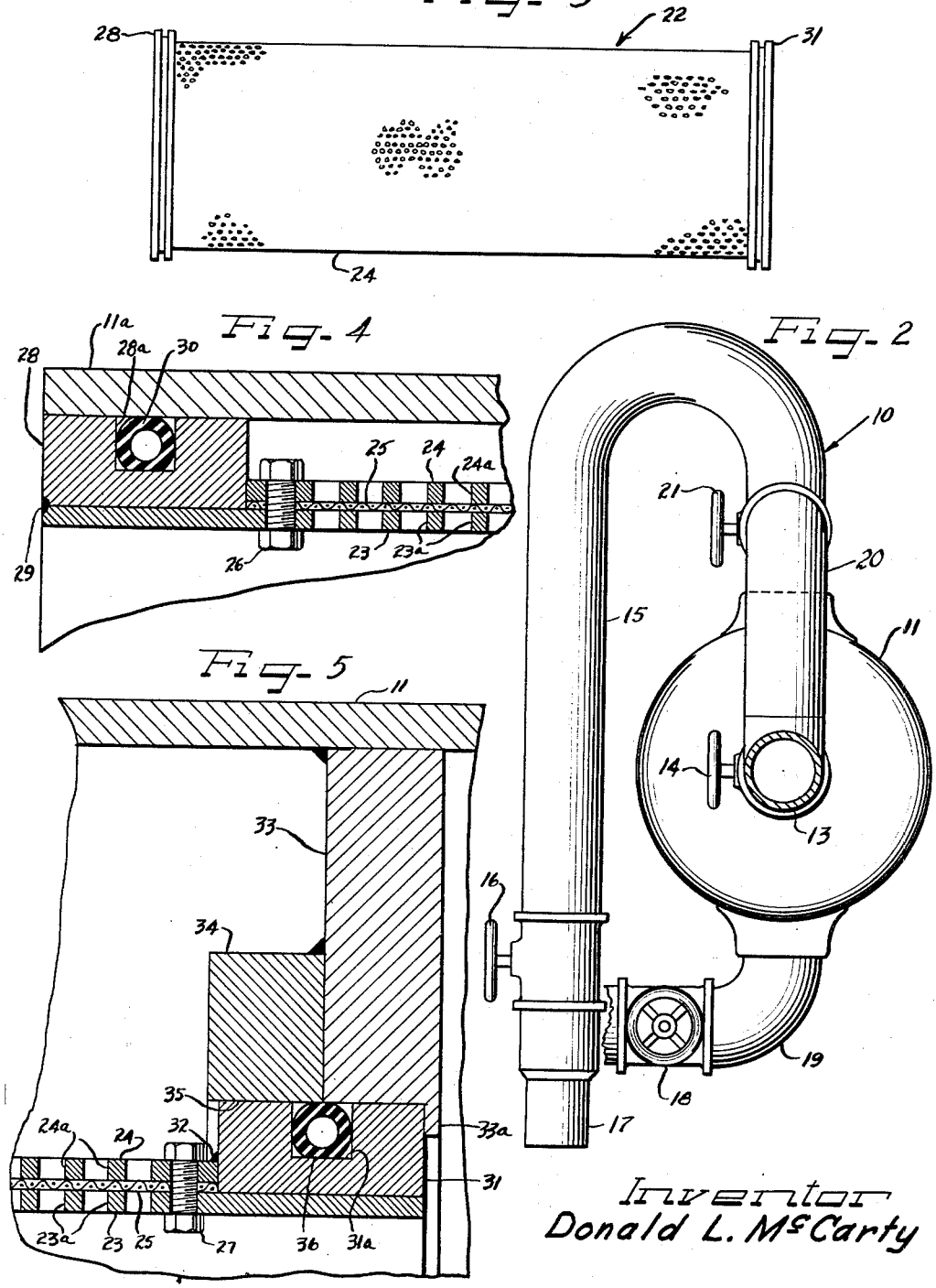

This invention relates to strainers or filters and, more particularly, to a reverse wash strainer adapted for use in the removal of solids from fluids.

Although the instant invention may have use in a number of different fields, it is particularly useful in the removal of solids from pipe line fluids such as crude oil, and it will be described primarily in connection with this use. Although it will be appreciated that the removal of solids from pipe line fluids with a strainer or screen is relatively simple, the problem arises in the cleaning of the strainer. Shutting down the flow of fluid through the pipe line, breaking open the pipe line and manually cleaning the strainer is, of course, wholly impractical in this modern day and age. Heretofore one practice was to employ a fine mesh screen, such as stainless Dutch weave cloth welded to a perforate reinforcing or backing element which supported the screen against the pressure of the fluid impinging thereon. It was not practical to shut down the pipe line each time the screen became clogged and remove this cartridge or basket (i.e., the screen and its reinforcing element) and replace it with another basket. Back washing of the screen was not thought to be practical, because the reverse pressure on the screen tended to destroy the same and it was also thought that this would necessitate a temporary shutdown of the pipe line. In addition, it was thought that the solid particles impinged on and stuck to the screen could not be removed by back washing.

More recently, an on line jet cleaning device was proposed and offered to the industry. In this arrangement a rotary jet head is provided for impinging jets of water against the exposed and dirty side of the screen to remove the solid particles. The jet arrangement allegedly permitted only a relatively short shutdown of the pipe line; but even this was sufficient to cause pumps in the line to lose their prime. In addition, the water jet head had to be operated by an electric motor to rotate the same and this was disadvantageous because electric power was ordinarily not available at the remote locations of some of the strainer systems. Separate power generators were required. Also, the water jets were often inadequate to obtain the necessary and complete cleaning of the screen.

The instant invention relates to a reverse wash strainer that overcomes most of the disadvantages of the prior art. First of all, the instant reverse wash strainer may be operated to clean the screen without damage to the screen and without causing pumps in the line to lose their prime. Moreover, the instant reverse wash strainer is provided with a basket wherein the screen is clamped in such a manner that a new screen can be substituted for an old, worn out screen without replacing the entire basket, which was not the case with the basket used in the prior art, particularly in the jet-cleaner system previously described. In addition, it has been found that the instant reverse wash strainer can be operated to obtain wholly satisfactory, complete cleaning of the screen during the reverse washing thereof, which requires only a very few minutes or even a few seconds.

It is, therefore, an important object of the instant invention to provide a strainer for the removal of solids from fluids, which can be cleaned while retained on line.

It is a further object of the instant invention to provide a strainer unit comprising a pair of nested perforate reinforcing members, a strainer screen carried therebetween and supported thereby so as to define therewith a strainer basket, a housing receiving said basket and defining therewith two separate chambers separated by said strainer screen, separately controlled means adapted to feed fluid from a common source into both said chambers and separately controlled means adapted to withdraw fluid from both said chambers.

Other objects, features and advantages of the present invention will become apparent to those skilled in the art from the following detailed disclosure thereof and the drawings attached hereto and made a part hereof.

On the drawings:

FIGURE 1 is a side elevational view of the strainer unit of the instant invention;

FIGURE 2 is an end elevational view of the strainer unit of the instant invention shown in FIGURE 1;

FIGURE 3 is a side elevational view of the strainer basket of the instant invention (which is shown in its position within the strainer unit of FIGURE 1 in light dashed lines);

FIGURE 4 is a fragmentary detail sectional elevational view of a portion of the left hand head of the basket of FIGURE 3 within the strainer unit of FIGURE 1; and FIGURE 5 is a fragmentary detail sectional elevational view of the right hand head of the basket of FIGURE 3 as it is mounted in the strainer unit of FIGURE 1.

As shown on the drawings:

Referring to FIGURES 1 and 2, it will be seen that the strainer system indicated generally by the reference numeral 10 comprises a generally cylindrical strainer housing 11 mounted horizontally on a suitable supporting framework 12. The strainer housing 11 may be made of any suitable metal which can withstand corrosion of the fluid being strained therein. For example, the housing 11 may be made of corrosion resistant steel and it may have the inside thereof lined with enamel or porcelain if, for example, it would be used for the straining of more corrosive material such as fruit or vegetable juices (e.g. tomato juice).

A first or inlet conduit 13 feeds fluid from a source of fluid under pressure (indicated diagrammatically at S) through a valve 14 into the housing 11 and a second or outlet conduit 15 receives fluid from the housing 11, withdrawing the fluid therefrom through a valve 16 and feeding into the continuation of the fluid pipeline (a portion of which is shown at 17). A drain valve 18 mounted in the drain 19 communicating with the interior of the housing 11 is ordinarily closed during normal operation. In addition, there is a third conduit 20 communicating with the interior of the housing 11 via the second conduit 15 and also communicating with the first conduit 13 upstream of the valve 14 in the first conduit 13. The third conduit 20 is provided with a valve 21 which is closed during the conventional straining operation. The function of the third conduit 20 and the valve 21 will be discussed hereinafter.

Mounted in generally axial alignment within the housing 11 is a generally cylindrical strainer basket indicated generally by the reference numeral 22.

Referring now to FIGURES 3, 4 and 5, it will be seen that the basket 22 comprises a first reinforcing cylinder 23 having perforations 23a of generally circular cross-section, a second reinforcing cylinder 24 having perforations 24a of generally circular cross-section, and a generally cylindrical strainer screen 25. The first cylinder 23 is separably telescopically received by the second cylinder 24 and clamps the screen 25 thereagainst. The first cylinder 23 and the second cylinder 24 are bolted together by bolt and nut assemblies (one of which 26 is shown at the left hand side of the basket 22 in FIGURE 4 and another of which 27 is shown at the right hand side of the basket 22 in FIGURE 5), so that they may be separated easily and quickly and a new screen may be substituted for the old screen 25. As shown in FIGURES 3 and 4, at the left hand side of the basket 22 there is an annular head member 28, which is welded to the first or inner reinforcing cylinder at 29. FIGURE 4 also shows a reduced neck portion 11a of the housing 11, which is also shown at the left hand side of FIGURE 1. As will be noted, the basket head 28 is substantially flush with the reduced neck portion 11a and an O-ring seal 30 mounted in a groove 28a of the head 28 furnishes a fluid seal between the head 28 and the reduced neck portion 11a of the housing 11.

Referring to FIGURES 3 and 5, it will be seen that at the right hand end of the basket 22 there is another annular head 31, which is welded to the right hand end of the outer or second reinforcing cylinder 24 at 32. Adjacent the head 31 there is an annular wall flange 33 which is welded to the interior of the housing 11. The wall flange 33 has an annular plate 34 welded thereto for the purpose of providing an expanded sealing surface 35. An O-ring 36 mounted in a groove 31a in the head 31 forms a seal between the head 31 and the sealing surface 35 on the wall flange 33.

It will also be noted that the wall flange 33 is provided with a shoulder 33a against which the outer portion of the head 31 abuts and this shoulder 33a prevents the basket 22 from moving further to the right (as shown in FIGURE 1) into the housing 11. It will be appreciated that the basket 22 is slid through the reduced neck portion 11a of the housing 11 into the housing 11 until the head 31 abuts the shoulder 33a during assembly. Then in completing the assembly of the unit, a head plug 37 (FIGURE 1) closes off the reduced neck portion 11a and is locked in position by a locking arm 38 to seal off the opening. The unit 10 is then assembled and ready for use.

With the assembling of the unit 10 in the manner just described, it will be seen that the seal effected by the O-ring 36 divides the interior of the housing 11 into two chambers. As shown in FIGURE 1, one chamber A is a generally cylindrical chamber extending substantially the full length of the housing 11; whereas the other chamber B is a generally annular chamber extending from the reduced neck portion 11a at the left hand side of the housing 11 across to the annular wall flange 33.

In ordinary strainer operation the valves 18 and 21 are closed and the valves 14 and 16 are open. In this situation the fluid such as crude oil passes through the inlet conduit 13 into the one chamber A, through the strainer basket 22 and the screen 25 therein into the other chamber B then out the outlet conduit 15. As the straining or filtering operation proceeds, solid particles accumulate on the screen 24 and the pressure drop across the screen 24 increases. The amount of fluid which can pass through the screen 24 at a given back pressure reduces. Eventually, it becomes necessary to clean the screen 24.

The cleaning of the screen 24 involves cooperation between the four valves 14, 16, 18 and 21 in such a manner that the pump does not lose its prime and the flow of fluid in the incoming conduit 13 is not stopped. This is accomplished by first cracking the valve 18 to allow slight drainage therethrough; then closing the valve 16; next opening the valve 21; next closing the valve 14; and finally opening the valve 18 wide. It will be appreciated that a skilled operator can accomplish this manipulation of the valves quite quickly and expertly, so that flow through the inlet conduit 13 is not appreciably interrupted. This would be done primarily by manipulation of the valve 18 during the changing of the other valves 14, 16 and 21.

The foregoing operation results in back washing of the screen 25. This results in the flow of fluid from the first conduit 13 directly into the third conduit 20, then into the second conduit 15 immediately adjacent the housing 11, next into the housing 11 and the other chamber B thereof, then through the basket 22 and the screen 24 therein and into the first chamber A of the housing 11, and then out through the drain line 19. The amount of oil or similar material passing out through the drain may be emptied into a sump where the solid particles can settle out and the crude oil may be reprocessed through the unit and salvaged.

The back washing operation in the instant device 10 does not injure the screen 25, because the screen 25 is reinforced against the back washing pressure by the inner reinforcing cylinder 23. During ordinary straining operation, the screen 25 is reinforced against incoming pressure in chamber A by the outer reinforcing cylinder 24. Of course, the cylinders 23 and 24 may have other shapes, but they should have substantially similar shapes so that they may be mounted in nested relationship with the strainer screen therebetween and supported thereby so as to define therewith a strainer basket. The housing 11 may also have different shapes. Nevertheless, it has been found that the generally cylindrical shape of the housing 11 and the basket 22 as described herein has a number of commercial advantages in operation, back washing, assembly and disassembly, as well as simplicity of maintenance.

The entire back washing operation requires only about two minutes and this involves the setting of the valves for back washing operation, the actual back washing itself (which requires only a few seconds) and the resetting of the valves for on line operation. Actually, the time required for reverse wash of the screen 24 is that sufficient to obtain the normal minimum pressure drop across the screen during the reverse wash operation. To convert back to on line operation, the operator throttles down the valve 18; cracks open the valve 14; closes the valve 21; opens the valve 16; opens the valve 14 wide; and closes the drain valve 18 tight.

Another aspect of the invention resides in the use of perforations 23a, 24a of generally circular cross-section. This results in what has been found to be the best type of reinforcement for the screen here used which is a 100 mesh Monel screen. This shape of perforation is distinctly superior to elongated slots. The reinforcing cylinders 23 and 24 (and their head flanges 28 and 31) can be made of any suitable metal that is sufficiently corrosion resistant to handle the fluid being strained. For example, in the case of highly corrosive materials these elements may be made of stainless steel. The same is true of the conduits and valves here shown.

It will be understood that modifications and variations may be effected without departing from the spirit and scope of the novel concepts of the present invention.

I claim as my invention:

A strainer system comprising a strainer housing, a first conduit feeding fluid into the housing, a second conduit receiving fluid from the housing, valves in said conduits adjacent the housing in control of flow therethrough, a first reinforcing cylinder having perforations of generally circular cross-section, a second reinforcing cylinder having perforations of generally circular cross-section, a generally cylindrical strainer screen, said first cylinder being separably telescopically received by the second cylinder and clamping the screen thereagainst so as to define therewith a strainer basket, a housing receiving said basket and defining therewith two separate chambers separated by said strainer screen, one of said chambers being adapted to receive fluid from said first conduit and the other of said chambers being adapted to feed fluid into said second conduit, a drain valve in conttrol of flow of fluid out of the housing from said one of said chambers, a third conduit communicating with said other of said chambers and with said first conduit upstream of the valve therein, and a valve in said third conduit in control of flow therethrough whereby fluid may be passed through said screen selectively from one of said chambers to the other and in reverse from the other of said chambers to the one, said strainer basket being separably mounted as a unit within said housing, said strainer housing defining a generally circular opening at one end thereof for separably receiving the strainer basket unit, and a head member separably mounted in said opening for clamping the strainer basket unit in the housing, said housing having an interior annular wall flange, said basket unit having annular head flanges at opposite ends thereof each having an outer cylindrical guide surface provided with a sealing ring groove, one of said head flanges being slidably received by the interior annular wall flange in the housing and the other of said head flanges being slidably received by the interior wall of the housing at the circular opening and having a substantial axial dimension to axially guide the unit into the housing opening and to center said one of said head flanges for sliding reception in said wall flange.

References Cited in the file of this patent
UNITED STATES PATENTS

| | | |
|---|---|---|
| 870,727 | Kneuper | Nov. 12, 1907 |
| 1,693,741 | Wuest | Dec. 4, 1928 |
| 2,658,622 | Thornhill | Nov. 10, 1953 |
| 2,868,382 | Best | Jan. 13, 1959 |